US012534352B2

(12) United States Patent
Durette

(10) Patent No.: US 12,534,352 B2
(45) Date of Patent: Jan. 27, 2026

(54) CAN CUTTING DEVICE

(71) Applicant: Smart Skin Technologies Inc., Fredericton (CA)

(72) Inventor: Shawn Maurice Dale Durette, Yoho (CA)

(73) Assignee: Smart Skin Technologies Inc., Fredericton (CA)

( * ) Notice: Subject to any disclaimer, the term of this patent is extended or adjusted under 35 U.S.C. 154(b) by 170 days.

(21) Appl. No.: 18/242,777

(22) Filed: Sep. 6, 2023

(65) Prior Publication Data

US 2024/0076174 A1 Mar. 7, 2024

Related U.S. Application Data

(60) Provisional application No. 63/404,209, filed on Sep. 7, 2022.

(51) Int. Cl.
*B67B 7/46* (2006.01)

(52) U.S. Cl.
CPC .......... *B67B 7/34* (2013.01); *B67B 2007/303* (2013.01)

(58) Field of Classification Search
CPC ........ B67B 7/34; B67B 7/36; B67B 2007/303
See application file for complete search history.

(56) References Cited

U.S. PATENT DOCUMENTS 1,969,868 A * 8/1934 Wright ...................... B67B 7/34 30/410
1,985,489 A * 12/1934 Eames ...................... B67B 7/34 30/418
3,073,193 A 1/1963 Grant
3,481,234 A 12/1969 Luce, Sr.
3,748,934 A * 7/1973 Lezberg .................. B23B 25/06 82/48
3,838,653 A 10/1974 Larkin et al.
3,960,099 A 6/1976 Dobias et al.
3,994,251 A 11/1976 Hake et al.
4,649,780 A * 3/1987 Takeuchi ............... B29D 29/00 82/98
4,734,986 A * 4/1988 Peters ........................ B67B 7/34 30/410

(Continued)

FOREIGN PATENT DOCUMENTS

CN 204365779 U 6/2015
KR 200431035 Y1 11/2006

OTHER PUBLICATIONS

International Search Report and Written Opinion mailed Oct. 29, 2021 in related International Patent Application No. PCT/CA2021/051016 (7 pages).

*Primary Examiner* — Omar Flores Sanchez

(57) ABSTRACT

Improved systems and methods for cutting a can are provided. The system includes a can cutting device having a main body, a can support assembly, and a cutter. The can support assembly has a can support rotatable about a can support longitudinal axis. The can is positionable in a mounted position that holds the can body in contact with the can support at least at a cutting location. When the can is positioned in the mounted position, the can is rotatable about a can axis of rotation. When the cutting surface is in contact with the can body supported by the can support at the cutting location and the can is rotated about the can axis of rotation, the cutting surface cuts the portion of the can body at the cutting location.

16 Claims, 8 Drawing Sheets

(56) References Cited

U.S. PATENT DOCUMENTS

| | | | | | |
|---|---|---|---|---|---|
| 4,781,047 | A * | 11/1988 | Bressan | B21D 51/2638 72/105 |
| 5,555,783 | A * | 9/1996 | Pienta | B26D 3/161 82/101 |
| 5,794,353 | A * | 8/1998 | Lin | B67B 7/34 30/418 |
| 5,802,725 | A * | 9/1998 | Drifka | B67B 7/34 30/426 |
| 7,347,130 | B2 | 3/2008 | Pham et al. | |
| 9,120,588 | B2 | 9/2015 | Deckert et al. | |
| 10,981,767 | B1 * | 4/2021 | Luo | B67B 7/34 |
| 2007/0044325 | A1 * | 3/2007 | Chong | B67B 7/32 30/400 |
| 2012/0005907 | A1 * | 1/2012 | Peedell | B67B 7/34 30/418 |
| 2012/0047753 | A1 * | 3/2012 | Mah | B67B 7/385 30/418 |
| 2022/0017344 | A1 * | 1/2022 | Waltenspül | B67B 7/34 |
| 2025/0066177 | A1 * | 2/2025 | Diaz | B67B 7/20 |

* cited by examiner

CAN CUTTING DEVICE

FIELD OF THE INVENTION

The present invention is directed to the field of cutting devices and, more particularly, to cutting devices for cylindrical containers.

INTRODUCTION

Various applications require containers to be cut to precise sizes. For instance, cylindrical containers such as cans may need to be cut to specific sizes to permit or facilitate various manufacturing or testing processes. Different types of devices may be used to cut, for example, cans, depending on the desired application. For example, a typical can opener may remove the top portion of a can using a serrated cutter to rotate around the top of the can until the surface has been cut through.

Conventional cans (e.g., aluminum cans that may be used as beverage containers) often have thin walls. These cans are often difficult to cut due to the thin walls and cylindrical shape. Traditional can openers are often designed to apply a significant amount of force to the top surface of a can which may result in buckling of the can walls.

SUMMARY OF THE INVENTION

In accordance with one aspect of this disclosure, there is provided a can cutting device for a can having an open end, a base end, and a can body extending between the open end and the base end, the can cutting device comprising: a main body; a can support assembly coupled to the main body, the can support assembly having a shaft and a can support rotatably coupled to the shaft, the can support being rotatable about a can support longitudinal axis; and a cutter coupled to the main body, the cutter having a cutting surface, wherein: the can is positionable in a mounted position on the can support with the can mounted in a position that holds the can body in contact with the can support at least at a cutting location, when the can is positioned in the mounted position: the can is rotatable about a can axis of rotation, the cutting surface is positionable to contact the portion of the can body supported by the can support at the cutting location, and when the cutting surface is in contact with the portion of the can body supported by the can support at the cutting location and the can is rotated about the can axis of rotation, the cutting surface cuts the portion of the can body at the cutting location.

In any embodiment, the can cutting device may further comprise an adjustment mechanism usable to adjust the can cutting device between a cutting position and a loading position, wherein when the can cutting device is in the loading position, the can may be removably positionable in the mounted position on the can support, and when the cutting device is in the cutting position and the can is positioned in the mounted position: the cutting surface may contact the portion of the can body supported by the can support at a cutting location, and when the can is rotated about the can axis of rotation, the cutting surface may cut the portion of the can body at the cutting location.

In any embodiment, the main body may comprise a top frame portion and a bottom frame portion, and the adjustment mechanism may comprise a pivotable mount between the top frame portion and the bottom frame portion, wherein the pivotable mount may be operable to rotate the top frame portion to adjust the can cutting device between the cutting position and the loading position.

In any embodiment, the can cutting device may further comprise a pressure adjuster, the pressure adjuster may be operable to adjust a pressure of the cutting surface against the can body.

In any embodiment, the can cutting device may further comprise an adjustment lock movable between a locked position and an unlocked position, wherein when the adjustment lock is in the locked position the adjustment mechanism may be fixed to secure the can cutting device in one of the loading position and the cutting position and when the adjustment lock is in the unlocked position the adjustment mechanism may be operable to adjust the can cutting device between the cutting position and the loading position.

In any embodiment, the can cutting device may further comprise a guide plate mounted between the main body and the shaft, wherein when the cutting device is in the cutting position the guide plate may support the open end of the can.

In any embodiment, the can support may have a can support hardness value greater than a cutter hardness value of the cutter.

In any embodiment, the can support may be rotatably mounted to the shaft such that the can and the can support are concurrently rotatable.

In any embodiment, the shaft may have a shaft longitudinal axis and the shaft longitudinal axis may be generally colinear with the can support longitudinal axis.

In any embodiment, the can axis of rotation may be generally parallel with the can support longitudinal axis.

In any embodiment, a pressure of the cutting surface against the can body may be less than 5 lbs.

In accordance with one aspect of the disclosure, there is provided a method of cutting a can having an open end using, the method comprising: providing a can cutting device having a can support and a cutting surface; adjusting the can cutting device to a loading position for receiving the can; positioning the can support through the open end of the can such that the can is supported on the can support at a cutting location; adjusting the can cutting device to a cutting position such that the cutting surface contacts the can at the cutting location; and rotating the can such that the cutting surface cuts the can along a can circumference.

In any embodiment, rotating the can may further comprise applying a first pressure on the cutting location by the cutting surface for a first series of revolutions, and applying a second pressure on the cutting location by the cutting surface for a second series of revolutions.

In any embodiment, the first pressure may be greater than the second pressure and the method may further comprise using a pressure adjuster to adjust the pressure between the first pressure and the second pressure.

In any embodiment, the method may further comprise applying a force to the can in a longitudinal can direction such that the cutting location remains at the same relative position along a length of the can as the can is rotated.

In any embodiment, the can may be rotated by hand.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
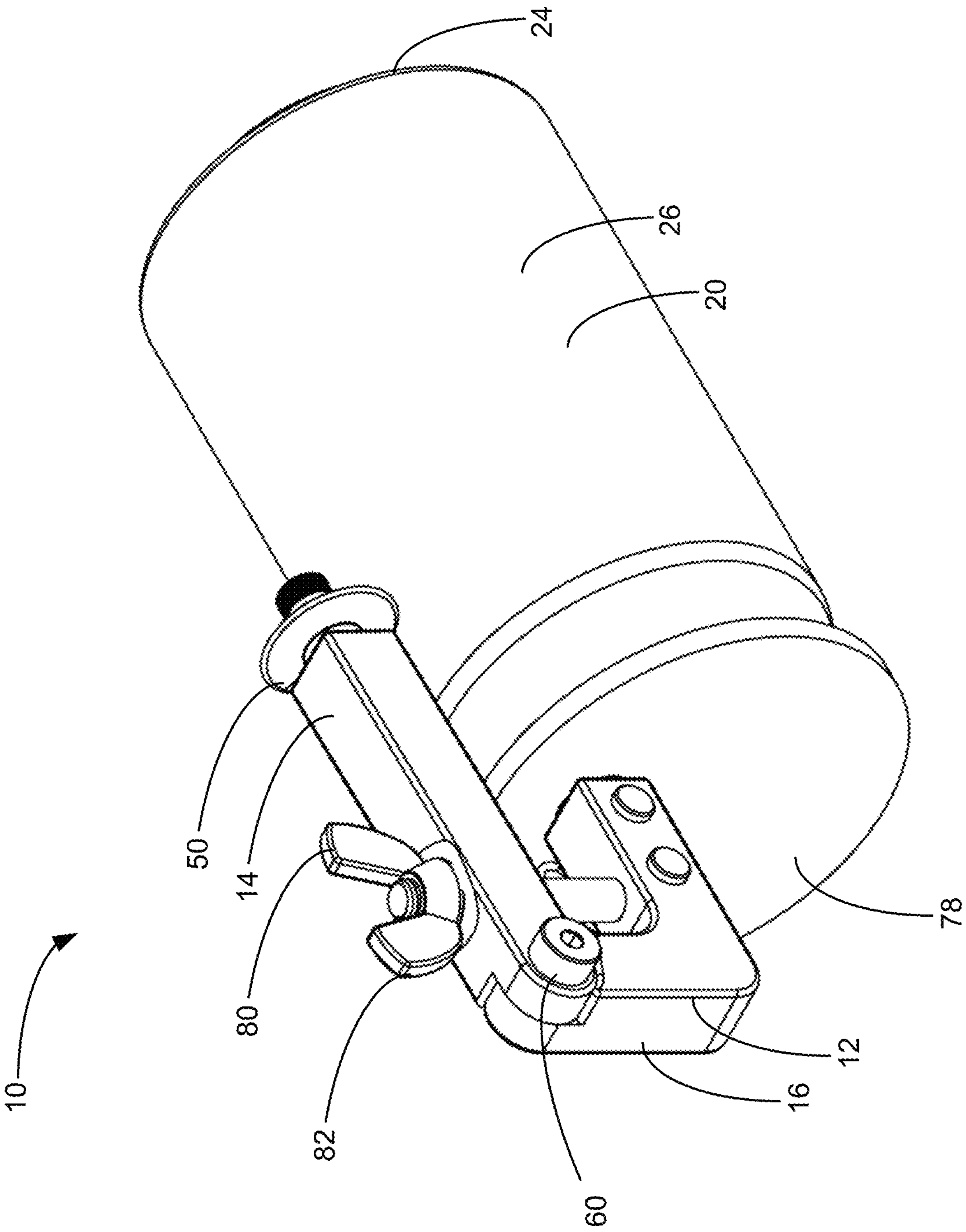
FIG. 1 shows a perspective view of a can cutting device with a can in accordance with an embodiment herein.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As used herein and in the claims, two elements are said to be "parallel" where those elements are parallel and spaced apart, or where those elements are collinear.

Referring to FIG. 1, shown therein is an exemplary embodiment of a can cutting device 10, also referred to as a cutting device 10. The can cutting device 10 may be used to cut a can 20. As shown, the can 20 is unseamed. Unseamed can 20 has an open end 22 that allows the can 20 to be mounted on the can cutting device 10 for cutting. As exemplified in FIG. 6, the can 20 has a base end 24 and a can body 26 extending between the open end 22 and the base end 24. Cutting device 10 may be used to cut the circumference of the can 20 to shorten its longitudinal length. Cutting device 10 may be configured to provide the can 20 with a clean cut opening. In other words, using the cutting device 10 may reduce and/or eliminate the presence of burrs or protrusions proximate the perimeter of the opening of the can 20 once the can 20 has been cut.

While the exemplified can 20 is a traditional aluminum beverage can, it will be appreciated that the can cutting device 10 may be used to cut any type, size, and material of unseamed can having an open end.

Referring to FIGS. 1-7, the can cutting device 10 has a main body 12, a cutter 50, and a can support assembly 30 coupled to the main body 12. The can support assembly 30 includes a shaft 32 extending along a longitudinal shaft axis 33. The can support assembly 30 also includes a can support 40 that extends along a longitudinal can support axis 41. The cutter 50 is used to provide a cutting surface 52 for cutting the can 20 when the can 20 is positioned on the can support 40.

The can support 40 provides a support surface for the can 20 to be cut on. The can support 40 may prevent the can 20 from collapsing during the cutting process. As exemplified in FIG. 7, the diameter of the can support 40 is smaller than the diameter of the can 20, thereby allowing the can 20 to be mounted on the can support 40 by passing the can support 40 through the open end 22.

The can support 40 may also be used as a leveling surface to maintain the cutter 50 perpendicular to the can body 26. Maintaining the cutter 50 generally perpendicular to the can body 26 may improve the precision of the cutting surface 52 and thereby improve the quality of the cut. Improving the stability of the cutting surface 52 may reduce error in the cutting process by maintaining the cutting surface 52 in the same longitudinal position on the can body 26 as it rotates about the can support 40 and/or the shaft 32.

In some embodiments, the shaft 32 may be fixed to the main body 12. Alternately, the shaft 32 may be removable from the main body 12. Removably coupling the shaft 32 to the main body 12 may allow a user to repair and/or replace shaft 32. For example, referring to FIG. 7, the main body 12 includes a main body aperture 13 for removably receiving the shaft 32.

Figure 7:
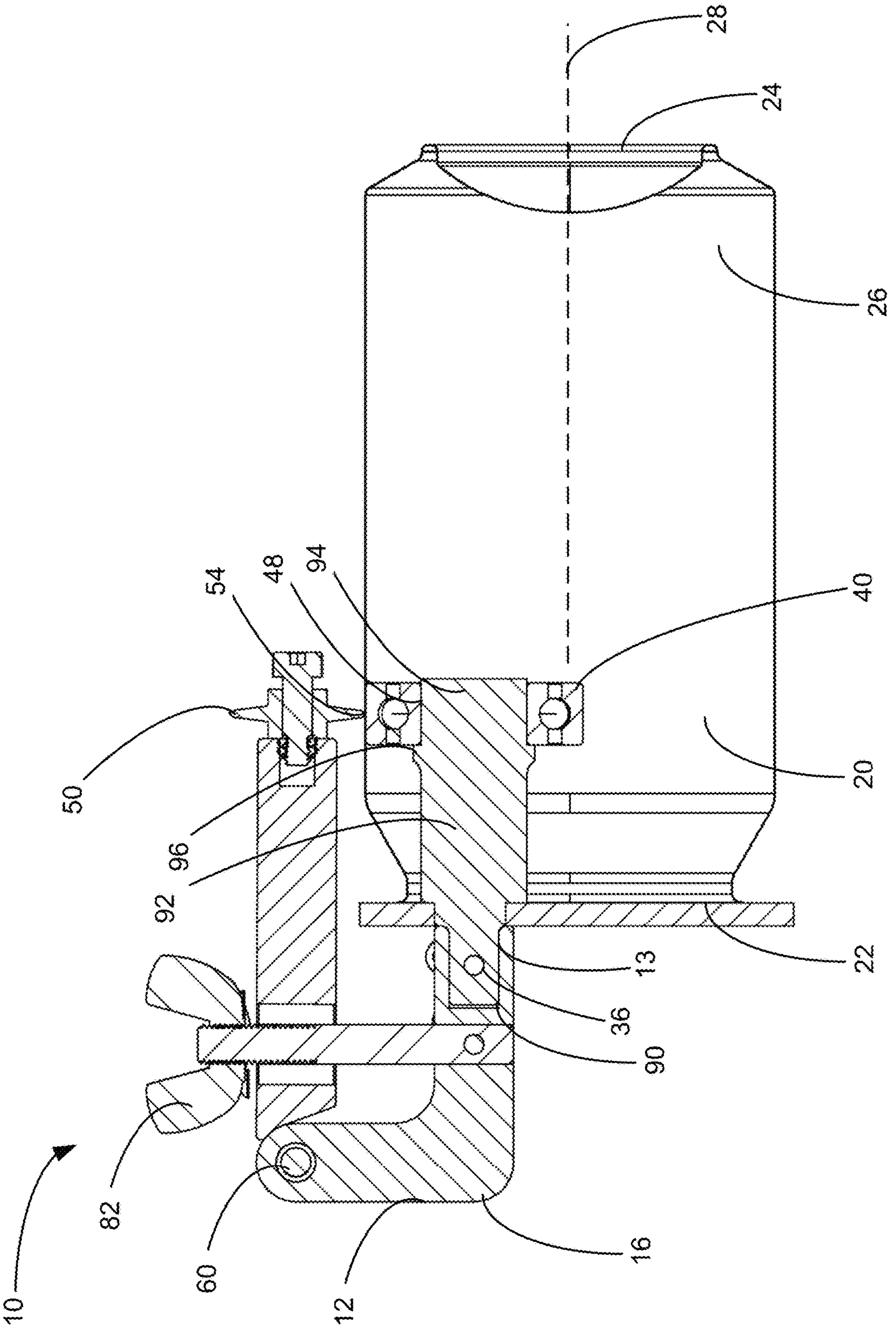
FIG. 7 shows a cross-sectional side view of the cutting device of FIG. 1 taken along the line 7-7 in FIG. 4.

In some embodiments, the shaft 32 includes a first portion 90, a second portion 92, and a third portion 94. Each portion of the shaft 32 may be sized and shaped the same or may be different. For example, as shown in FIG. 7, the first portion 90, the second portion 92, and the third portion 94 each have different diameters. The first portion 90 is sized and shaped to be received in the main body aperture 13 for coupling the shaft 32 to the main body 12.

To couple the shaft 32 to the main body 12, the shaft 32 can include a shaft aperture 36 for receiving an attachment member 38. To mount the shaft 32 to the main body 12, the attachment member 38 can be received in an opening 15 to the main body aperture 13 and the shaft aperture 36 concurrently. As illustrated, the protruding member 38 may extend through the opening 15, into main body aperture 13 and then to, and through, the shaft aperture 36.

To detach the shaft 32 from main body 12, a user may remove the pin 38 from the opening 15 and the shaft aperture 36. The shaft 32 may then be removed. Shaft 32 may subsequently be re-attached and/or replaced with a different shaft 32 by inserting the pin 38 into the shaft aperture 36 and the opening 15.

Figure 2:
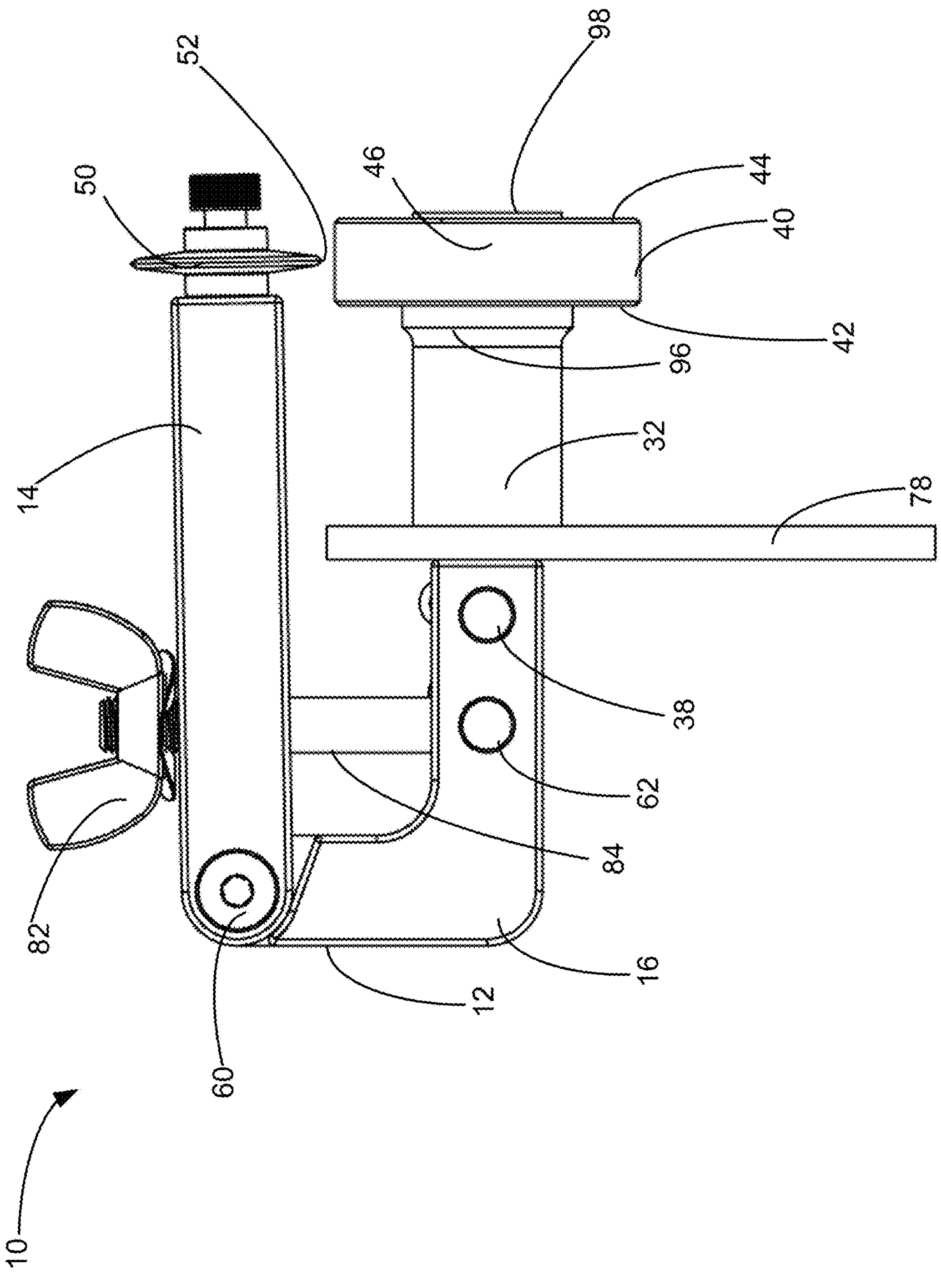
FIG. 2 shows a first side view of the cutting device of FIG. 1.
Figure 3:
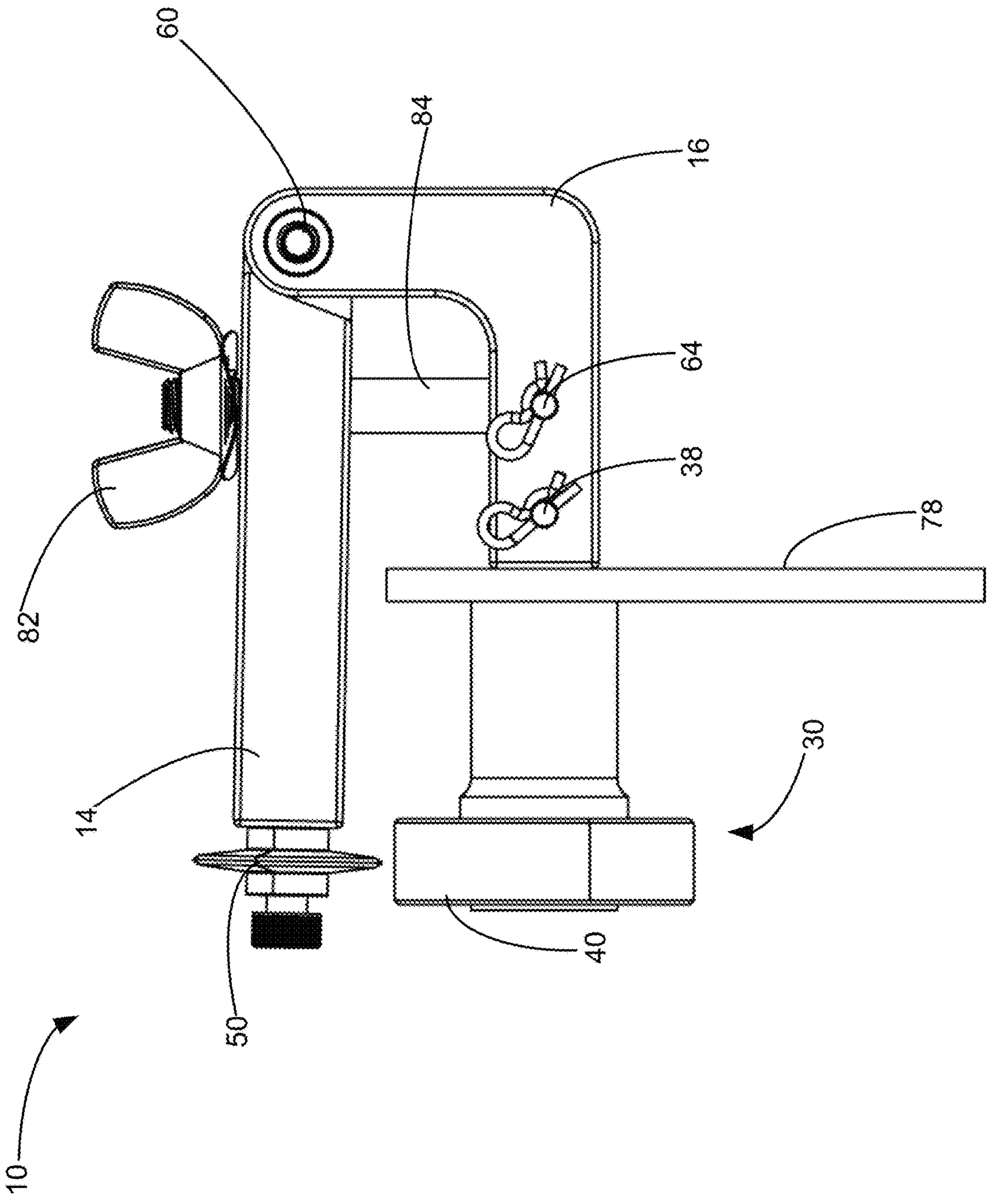
FIG. 3 shows a second side view of the cutting device of FIG. 1.
Figure 4:
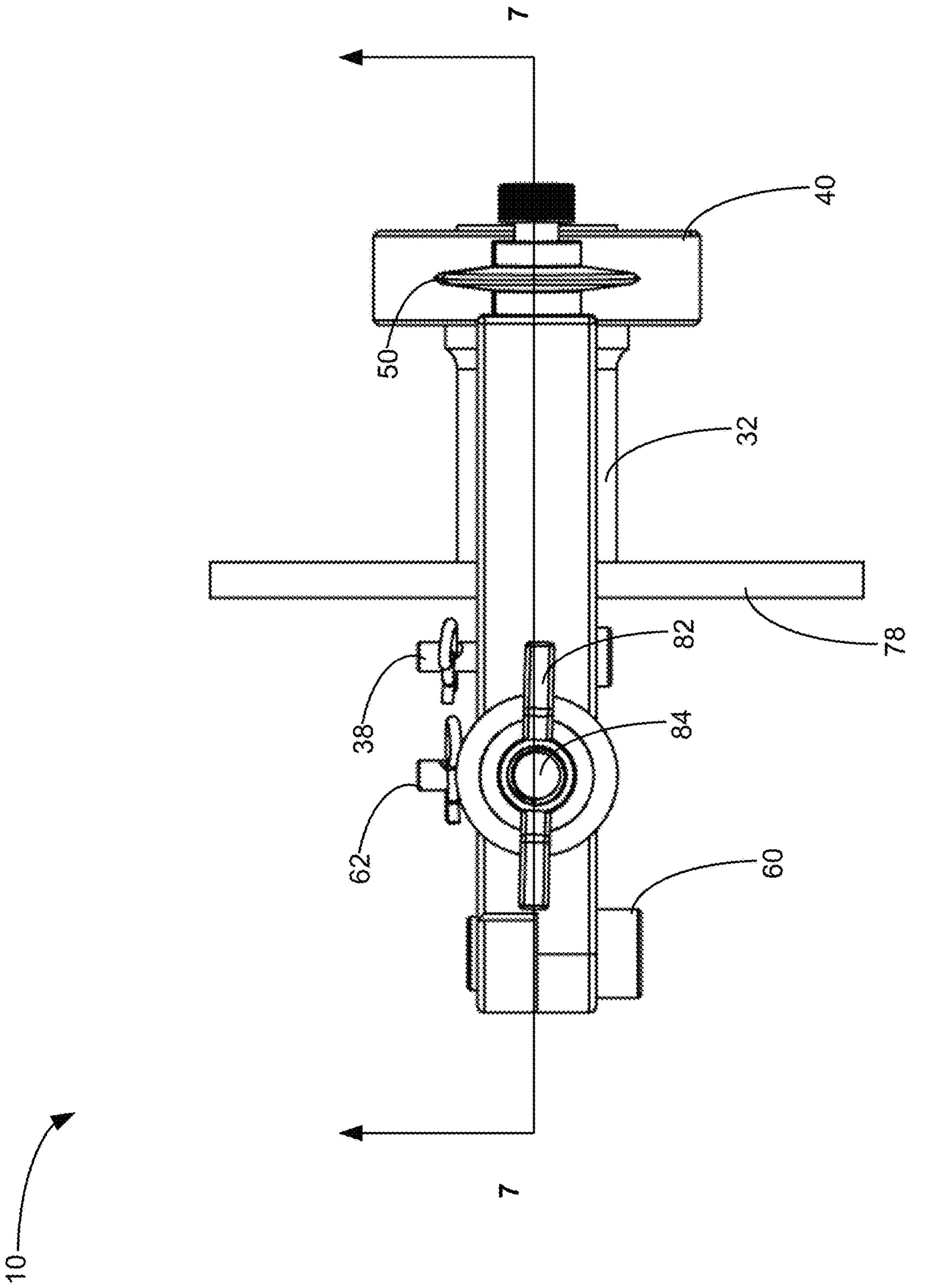
FIG. 4 shows a top view of the cutting device of FIG. 1.
Figure 5:
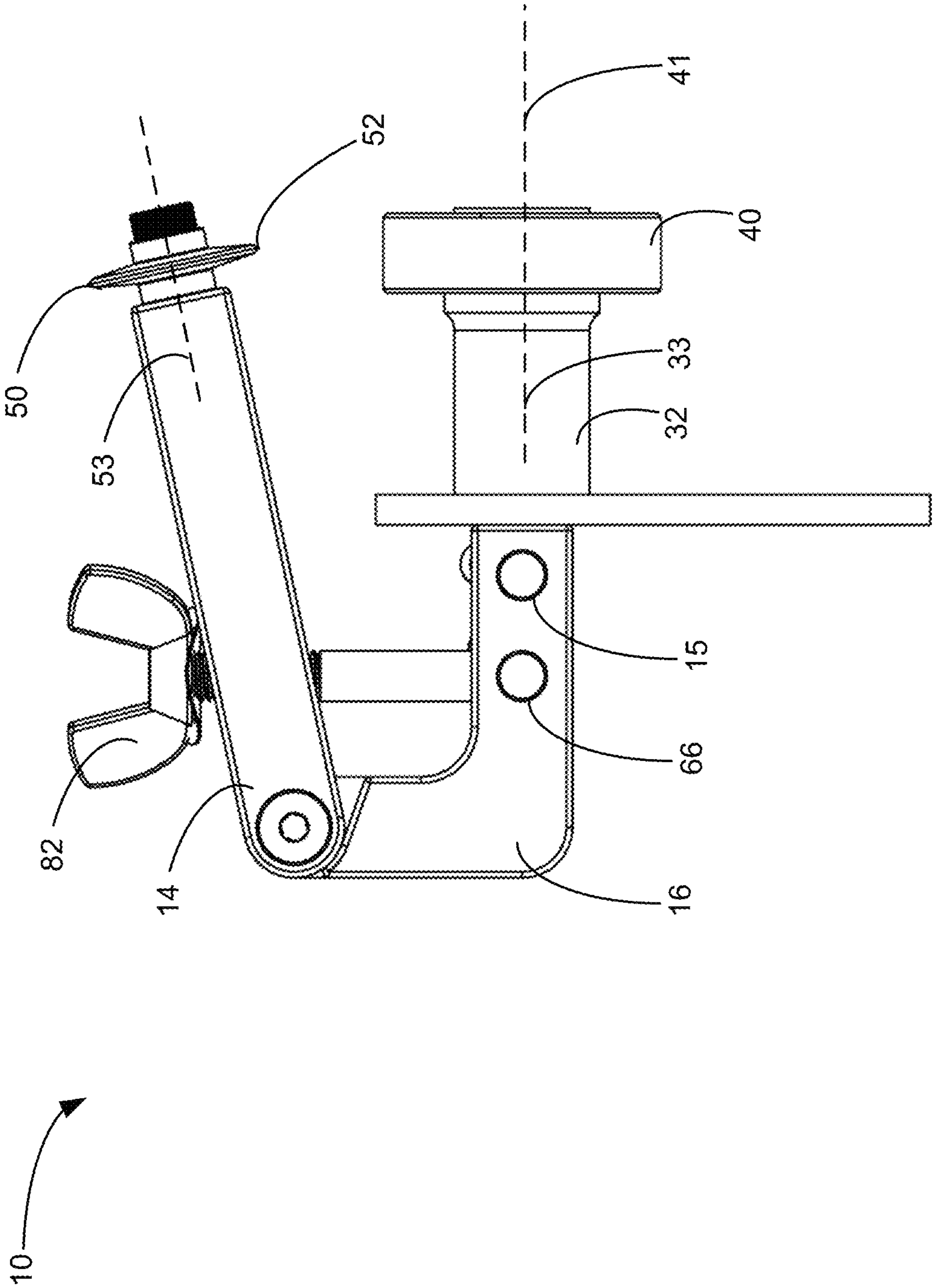
FIG. 5 shows a side view of the cutting device of FIG. 1 with the cutting device in a loading position.

As exemplified in FIGS. 2, 5 and 7, the third portion 94 of the shaft 32 may receive the can support 40. As shown, the third portion 94 may include a stop 96 for maintaining the can support 40 in the third portion 94. Similarly, an end stop 98 may be used to maintain the can support 40 on the third portion 94 between the stop 96 and the end stop 98.

As exemplified in FIGS. 2 and 5, the can support 40 has a first end 42, a second end 44, and a can support body 46 extending therebetween. The can support 40 may be rotatably coupled to the cutting device 10. For example, as shown in FIGS. 5 and 7, the can support 40 is a bearing that is rotatably coupled to the shaft 32. Accordingly, the bearing 40 can rotate about the can support longitudinal axis 41. In the example illustrated, the can support 40 may be removably received by the shaft 32. A user may remove the can support 40 from the shaft 32, e.g., for storage, maintenance and/or replacement.

As exemplified in FIG. 5, the second portion 92 of the shaft 32 may receive a guide plate 78. The guide plate 78 may be used to support the open end 22 of the can 20. Accordingly, a user may position the can 20 on the can support 40 by inserting the can support 40 through the open end 22. The guide plate 78 provides an end stop for the can 20 so that the user can align the can properly on the can cutting device 10. The user may apply a force in the longitudinal direction of the can 20 to maintain the open end 22 against the guide plate 78. Maintaining the open end 22 in the same longitudinal position may improve the accuracy of the cut as the can 20 is rotated.

Figure 6:
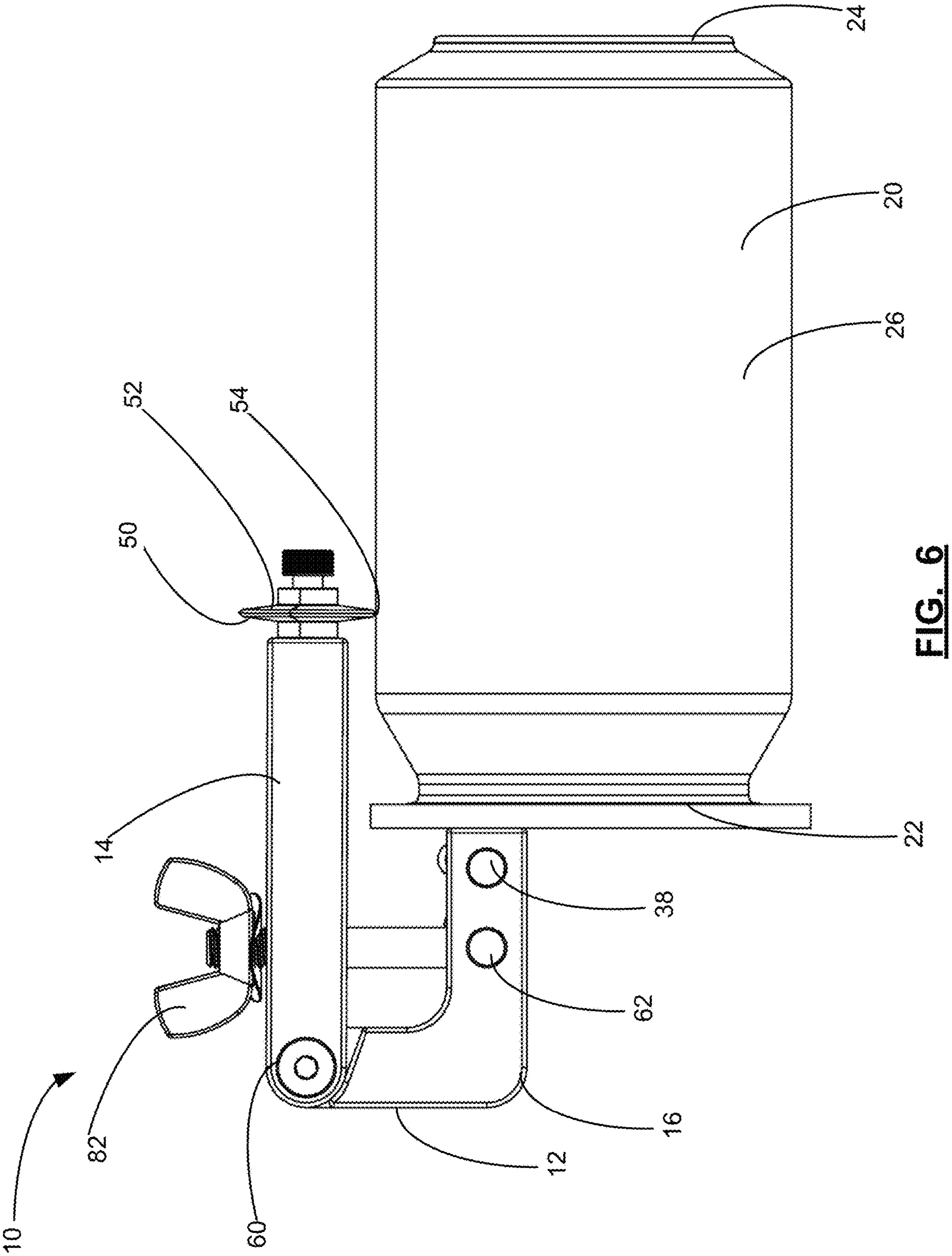
FIG. 6 shows a side view of the cutting device of FIG. 1 with a can and with the cutting device in a cutting position.

The cutter 50 can be positioned to cut can at a cutting location 54. The can 20 is positionable in a mounted position on the can support 40, as shown in FIG. 6. When the can 20 is positioned in the mounted position on the can support 40, the can 20 may be rotatable about a can axis of rotation 28. During operation, the cutting surface 52 may be positioned to contact the portion of the can body 26 supported by the can support 40 at the cutting location 54. The can 20 is rotated about the can axis of rotation 28 such that the cutting surface 52 cuts the portion of the can body 26 at the cutting location 54. In the mounted position, the can body 26 is in contact with the can support 40 at least at the cutting location 54. This support may help prevent buckling of the can 20 during the cutting process.

In some embodiments, as exemplified in FIGS. 1-7, the can cutting device 10 may include an adjustment mechanism 60. The adjustment mechanism 60 may allow the can cutting device 10 to be adjusted between a cutting position (see e.g., FIG. 6) and a loading position (see e.g., FIG. 5). When in the loading position, the can 20 may be removably positionable in the mounted position on the can support 40, as exemplified by FIG. 6. When the can 20 is mounted to the can support 40 and the can cutting device 10 is in the cutting position, the cutting surface 52 may contact the portion of the can body 26 supported by the can support 40 at the cutting location 54. The can support 40 may provide support for the can body 26 such that the cutting surface 52 applies a pressure at the cutting location 54. Accordingly, when the can is rotated about the can axis of rotation 28, the cutting surface 52 cuts the portion of the can body 26 at the cutting location 54.

For example, as shown in FIG. 1-7, the adjustment mechanism 60 is a pivotable mount. The main body 12 includes a top frame portion 14 and a bottom frame portion 16 coupled to the top frame portion 14. As exemplified, the pivotable mount 60 couples the top frame portion 14 to the bottom frame portion 16. The pivotable mount 60 is operable to rotate the top frame portion 14 to adjust the can cutting device 10 between the cutting position and the loading position.

Referring to FIG. 6, as exemplified, the can cutting device 10 is approximately smaller than the size of a traditional aluminum can 20. Accordingly, a user may hold the main body 12 in one hand and rotate the can 20 with the other in order to cut the can 20. An advantage of this design is that the device 10 is small, portable, and has few parts, thereby reducing the cost and improving the manufacturing process. For example, the parts of the device 10 may be 3D printed or may be made from metal. In some embodiments, the main body 12 may be mounted to a surface for increased stability.

It will be appreciated that for the cutting surface 52 to cut through the can body 26 without damaging the can support 40, the hardness value of the can support 40 may be selected to be greater than the hardness value of the cutter 50. In various embodiments, the hardness values for the can support 40 may be selected based on the particular requirements of a can cutting process.

Through continued use, the cutting surface 52 may be worn down by the hardness of the can support 40. Accordingly, the cutting surface 52 of the cutter 50 may be replaced with a new cutting surface 52 to ensure a clean cut of the can 20. Alternately or in addition, the cutting surface 52 may be sharpened and returned to the cutter 50 rather than replacing the cutting surface 52.

It will be appreciated that the cutting surface 52 may be any surface capable of cutting the can 20. In some embodiments, the cutting surface 52 may be stationary relative to the cutter 50. For example, the can 20 may be cut by rotating the can 20 about the can axis of rotation 28 such that the stationary cutting surface 52 cuts into the can body 26.

Alternately, the cutting surface 52 may be rotatable or movable. As shown in the example of FIGS. 1-7, the cutting surface 52 may be provided as a cutting wheel. The cutting wheel may be rotatable about a cutting surface axis of rotation 53. The cutting surface 52 may be manually or automatically rotatable about the cutting surface axis of rotation 53. In the exemplified embodiment, the cutting surface 52 may rotate with rotation of the can body 26. In other words, when the cutting surface 52 is in contact with the can 20 and the can 20 is rotated about the can axis of rotation 28, the cutting surface 52 may rotate in an opposite direction to the rotation of the can 20 due to the friction force between the cutting surface 52 and the can body 26. For example, if the can body 26 is rotated in a clockwise direction, the frictional force against the cutting surface 52 may cause the cutting wheel 52 to rotate in a counter-clockwise direction. Depending on the applied force, the cutting surface 52 may remain stationary while the can body 26 rotates, using the rotation of the can body 26 to cut the circumference of the can 20.

The can support 40 may include a recess 48 for receiving shaft 32. In some embodiments, the can support 40 may be rotatably mounted to the shaft 32 such that the can 20 and the can support 40 are concurrently rotatable. For example, when the can 20 is rotated, the pressure at the cutting location 54 caused by the cutter 50 may provide a sufficient friction force between the can 20 and the can support 40 to cause the can support 40 to rotate with the can 20. Such concurrent rotation may allow a user to apply less force to the can 20 while still causing the can 20 to rotate. Reducing the force required to rotate the can 20 may allow for a smoother and more consistent rotation of the can 20. This may reduce the likelihood of burrs forming along the cut surface.

Regardless of the can size, the cutting location 54 may remain consistent relative to the cutting device 10, despite the changing position of the can 20. In other words, even though the can 20 may rotate eccentrically around the can support 40, the relative distance between the can support 40 and the circumference of the can 20 at the cutting location 54 may remain generally constant. Thus, the can may be any size.

During use, the can 20 may be mounted onto the can support 40, as shown in FIG. 6. The can 20 is supported by the can support 40 at the cutting location 54, while leaving a gap between the can body 26 and the can support 40 at the lower side of the can support 40, as shown in FIG. 7. As the can 20 rotates about the can axis of rotation 28, the guide plate 78 supports the open end 22 while maintaining the cutting location 54 at a consistent elevation and longitudinal distance from the guide plate 78. The guide plate 78 may also help to maintain the cutting location 54 of the circumference of the can 20 in proper alignment with the can support 40.

As described above, the can support 40 may also rotate about the shaft 32. Due to the difference in diameters between the can 20 and the can support 40, relative rotation between the can support 40 and the can 20 may not interfere with the cutting process since the cutting location 54 remains in the same position. It will be appreciated that the can support 40 and the can 20 may rotate together or separately, at the same or different speeds, depending on the applied force of rotation by the user and the pressure of the cutter 50, as well as friction between the can support 40 and the can 20 and the relative diameters. In other words, the can support 40 and the can 20 may rotate at different frequencies while still allowing the can support 40 to support the can 20 at the cutting location 54, and also while allowing for easy loading and removal of the can 20 from the can support 40.

In some embodiments, the guide plate 78 may include a circular groove (not shown) to receive the open end 22 of the can 20. The groove may improve the contact between the can body 26 and the guide plate 78. This groove may further reduce error during the can cutting process. For example, as the cutter 50 cuts the can 20 at the cutting location 54, the pressure of the cutting surface 52 may cause the can 20 to slightly leave the surface of the can support 40 distal to the cutting location 54. The circular grooves in the guide plate 78 may secure the open end 22 of the can 20 in place, thereby preventing the can 20 from leaving the can support 40 despite its rotation about the can support 40 and/or shaft 32. The guide plate 78 may be selected based on the can size. For example, a thicker or thinner guide plate 78 may be selected for different can sizes.

The shaft axis 33 and the can support axis 41 may be generally parallel. As shown in FIG. 5, the shaft axis 33 and the can support axis 41 may be generally colinear. Positioning the can support axis 41 generally colinearly with the shaft axis 33 may improve the cut of the can 20 by improving the consistency of the contact between the cutter 50 and the can 20. Since the can 20 rests on the can support 40, the angle of the can body 26 at the cutting location 54 relative to the shaft axis 33 can be generally the same as the angle of the can support 40 relative to the shaft axis 33. As the can body 26 rotates about the can axis of rotation 28, the parallel can support axis 41 and shaft axis 33 can provide a consistent cutting distance and pressure from the cutter 50 on the can body 26. In other words, positioning the can support axis 41 parallel to the shaft axis 33 may help to maintain the cutter 50 in a perpendicular orientation relative to the can body 26. As described above, having a perpendicular cutting surface 52 relative to the can body 26 may improve the quality of the cut.

Additionally, having the can support axis 41 parallel to the shaft axis 33 may increase the ease of use of the cutting device 10. Parallel axes may reduce the friction between the can support 40 and the shaft 32, thereby allowing a user to more easily apply a force to rotate the can support 40 about the shaft 32. As described above, reduction in friction may also improve the quality of the cut of the can 20 by reducing the likelihood of discontinuous applied force to the rotation of the can body 26. In other words, a user may more easily rotate the can 20 about the shaft 32 without the friction of the can support 40 causing the can 20 to move from its longitudinal position relative to the cutting surface 52 at the cutting location 54.

In some embodiments, the can cutting device 10 may include a pressure adjuster 80. The pressure adjuster 80 may be operable to adjust a pressure of the cutting surface 52 against the can body 26. As exemplified in FIG. 1-7, the pressure adjuster 80 may include a fastener 82 and a rod 84. The fastener 82 and the rod 84 are each threaded with corresponding threads. During operation, a user may rotate the fastener 82, thereby causing the fastener 82 to move downwardly along the rod 84. As the fastener 82 moves down the rod 84, the fastener 82 applies increasing pressure to the top frame portion 14 of the main body 12 and thereby increasing pressure applied to the cutting location 54 by the cutting surface 52.

The pressure adjuster 80 may allow a user to gradually increase the pressure on the can 20. This incremental control may allow a user to provide a highly controlled cut to the can 20 while minimizing excess pressure on can 20. For example, when in the cutting position, a user may rotate the can 20 by holding onto the can body 26. As the can 20 rotates, the cutter 50 begins to cut, or score, the can body 26 at the cutting location 54 with the cutting surface 52. Once the can 20 has completed one or more full rotations, the user may increase the pressure by rotating the fastener 82. Rotating the fastener 82 increases the pressure on the top frame portion 14, which causes the top frame portion 14 to move slightly downwards. Moving the top frame portion 14 downwards causes the cutter 50 to move downwards, thereby increasing the pressure of the cutter 50 on the can 20. A user may repeat this process at various increasing pressures until the can 20 is cut through its entire thickness. For example, the user may apply a first pressure on the cutting location 54 by the cutting surface 52 for a first series of revolutions and then may increase the pressure to a second pressure and apply the second pressure for a second series of revolutions. The user may continue increasing the pressure after more revolutions until the can 20 is cut all the way through. It will be appreciated that the pressure applied to the can body 26 may vary depending on the can material and the user operating the cutting device 10.

It will also be appreciated that a user need not wait until the can 20 has completed a full rotation before increasing the pressure on the can body 26. For example, a user may continuously increase the pressure at gradual increments as the can body 26 is rotated.

In some embodiments, the can cutting device 10 may have an adjustment lock 62 movable between a locked position and an unlocked position. When the adjustment lock 62 is in the locked position, the adjustment mechanism 60 is fixed to secure the can cutting device in one of the loading position and the cutting position. When the adjustment lock 62 is in the unlocked position, the adjustment mechanism 60 may be operable to adjust the can cutting device 10 between the cutting position and the loading position. As exemplified, the adjustment lock 62 may include a pin 64 receivable in an aperture 66, located within the bottom frame portion 16. The rod 84 of the pressure adjuster 80 includes a rod aperture (not shown) for receiving the pin 64. To lock the cutting device 10, a user may insert the pin 64 through the rod aperture, into the aperture 66. The pressure adjuster rod 84 then acts to secure the top frame portion 14 and the bottom frame portion 16 in the locked position. To unlock the cutting device 10, a user may remove the pin 64 from the aperture 66 and from the rod aperture.

Figure 8:
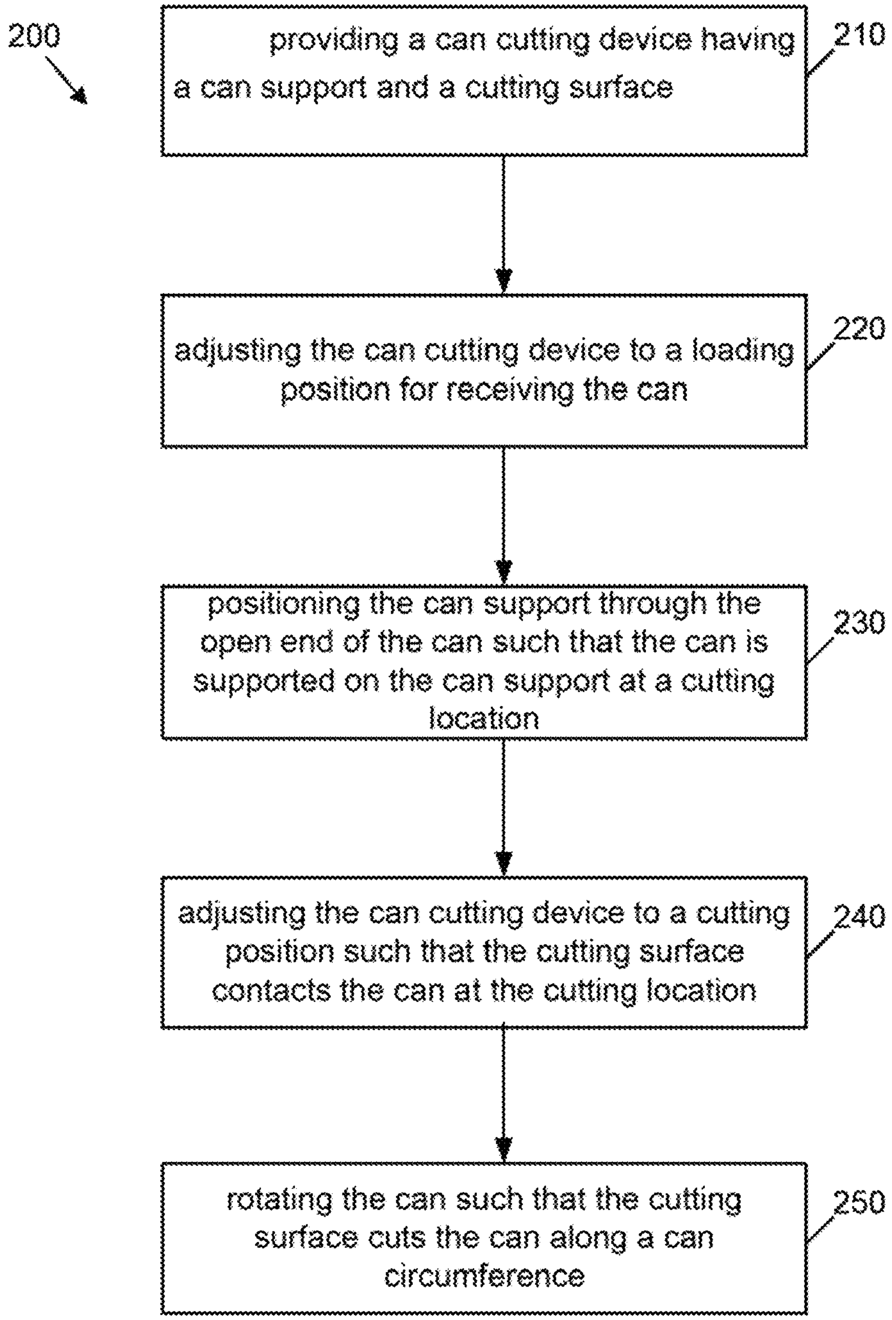
FIG. 8 shows a flow chart of a method of cutting a can according to an example.

The following is an example method 200 for cutting a can 20 using the can cutting device 10. Referring to FIG. 8, at 210, the can cutting device 10 having a can support 40 and a cutting surface 52 is provided.

At 220, a user may move the cutting device to the loading position for receiving the can 20, as shown in FIG. 5. In some embodiments, this step may involve moving the adjustment lock 62 to the unlocked position.

At 230, the user may then position the can support 40 through the open end 22 of the can 20 such that the can 20 is supported on the can support 40 at a cutting location 54, as shown in FIG. 6. In some embodiments, the can 20 may be moved along the can support 40 until the open end 22 contacts the guide plate 78.

Once the can 20 is mounted on the can support 40, at 240, the cutting device 10 may be adjusted from the loading position to the cutting position, as shown in FIG. 6, such that the cutting surface 52 contacts the can 20 at the cutting location 54. In some embodiments, moving the cutting device 10 from the loading position to the cutting position may involve rotating the top frame portion 14 downwardly and locking the adjustment lock 62.

The user may adjust the pressure using the pressure adjuster 80 to increase the pressure on the top frame portion 14, thereby causing the cutting surface 52 of the cutter 50 to contact the can body 26 at the cutting location 54.

At 250, the user may then begin to drive rotation of the can 20 by rotating the can body 26, for example, by hand. The user may apply a force to the can 20 in the longitudinal direction of the can 20 such that the cutting location remains at the same relative position along a length of the can 20 as the can 20 is rotated. As the can 20 rotates, the user may increase the pressure on the can 20 using the pressure adjuster 80 to increase the depth of the cut at the cutting location 54. The user may optionally repeat this process as many times as required, incrementally increasing the pressure on the can 20 by rotating the fastener 82 until the can 20 is circumferentially cut all the way through its thickness.

Once the can 20 has been cut through, the user may reduce the pressure by rotating the fastener 82 in the opposite direction to allow the cutter 50 to move away from the can body 26. The user may then unlock the adjustment lock 62. The top frame portion 14 may be lifted, and the can 20 may be unmounted from the can support 40.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A can cutting device for a can having an open end, a base end, and a can body extending between the open end and the base end, the can cutting device comprising:

a main body;

a can support assembly coupled to the main body, the can support assembly having a shaft and a can support rotatably coupled to the shaft, the can support being rotatable about a can support longitudinal axis; and a cutter coupled to the main body, the cutter having a cutting surface, wherein:

the can support is insertable through the open end of the can and the can is movably positionable on the can support, and, in a mounted position, the can being mounted in a position that holds the can body in contact with the can support at least at a cutting location, when the can is positioned in the mounted position:

the can is rotatable about a can axis of rotation, the cutting surface is positionable to contact the portion of the can body supported by the can support at the cutting location, and when the cutting surface is in contact with the portion of the can body supported by the can support at the cutting location and the can is rotated about the can axis of rotation, the cutting surface cuts the portion of the can body at the cutting location.

2. The can cutting device of claim 1, further comprising:

an adjustment mechanism usable to adjust the can cutting device between a cutting position and a loading position, wherein when the can cutting device is in the loading position, the can is removably positionable in the mounted position on the can support, and when the cutting device is in the cutting position and the can is positioned in the mounted position:

the cutting surface contacts the portion of the can body supported by the can support at the cutting location, and when the can is rotated about the can axis of rotation, the cutting surface cuts the portion of the can body at the cutting location.

3. The cutting device of claim 2, wherein the main body comprises a top frame portion and a bottom frame portion, and the adjustment mechanism comprises a pivotable mount between the top frame portion and the bottom frame portion, wherein the pivotable mount is operable to rotate the top frame portion to adjust the can cutting device between the cutting position and the loading position.

4. The cutting device of claim 1, further comprising a pressure adjuster, the pressure adjuster operable to adjust a pressure of the cutting surface against the can body.

5. The cutting device of claim 2, further comprising an adjustment lock movable between a locked position and an unlocked position, wherein when the adjustment lock is in the locked position the adjustment mechanism is fixed to secure the can cutting device in one of the loading position and the cutting position and when the adjustment lock is in the unlocked position the adjustment mechanism is operable to adjust the can cutting device between the cutting position and the loading position.

6. The cutting device of claim 1, further comprising a guide plate mounted between the main body and the shaft, wherein when the cutting device is in the cutting position the guide plate supports the open end of the can.

7. The cutting device of claim 1, wherein the can support has a can support hardness value greater than a cutter hardness value of the cutter.

8. The cutting device of claim 1, wherein the can support is rotatably mounted to the shaft such that the can and the can support are concurrently rotatable.

9. The cutting device of claim 1, wherein the shaft has a shaft longitudinal axis and the shaft longitudinal axis is generally colinear with the can support longitudinal axis.

10. The cutting device of claim 1, wherein the can axis of rotation is generally parallel with the can support longitudinal axis.

11. The cutting device of claim 1, wherein a pressure of the cutting surface against the can body is less than 5 lbs.

12. A method of cutting a can having an open end using a can cutting device, the method comprising:

providing the can cutting device, the can cutting device having a can support and a cutter having a cutting surface;

adjusting the can cutting device to a loading position for receiving the can;

inserting the can support through the open end of the can and movably positioning the can on the can support such that the can is supported on the can support at a cutting location;

adjusting the can cutting device to a cutting position such that the cutting surface contacts the can at the cutting location; and rotating the can such that the cutting surface cuts the can along a can circumference.

13. The method of claim 12, wherein rotating the can further comprises:

applying a first pressure on the cutting location by the cutting surface for a first series of revolutions, and applying a second pressure on the cutting location by the cutting surface for a second series of revolutions.

14. The method of claim 13, wherein the first pressure is greater than the second pressure and the method further comprises using a pressure adjuster to adjust the pressure between the first pressure and the second pressure.

15. The method of claim 12, further comprising applying a force to the can in a longitudinal can direction such that the cutting location remains at the same relative position along a length of the can as the can is rotated.

16. The method of claim 12, wherein the can is rotated by hand.

* * * * *